Figure 3:
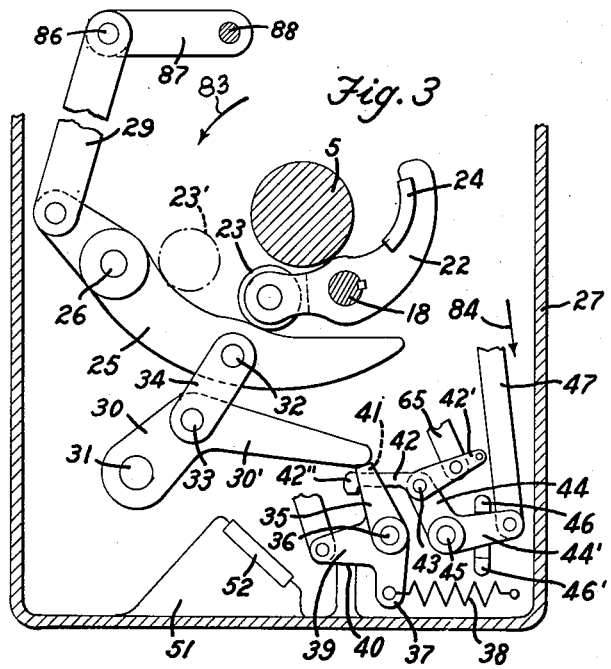

Sept. 11, 1956     L. KNÖCHL     2,762,480
SPRING ENGAGED AND LATCH RELEASED CLUTCH
Filed Oct. 5, 1950     3 Sheets-Sheet 1
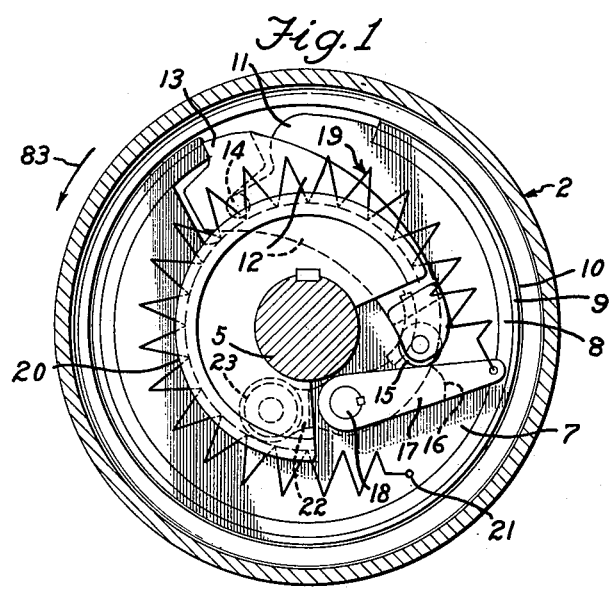
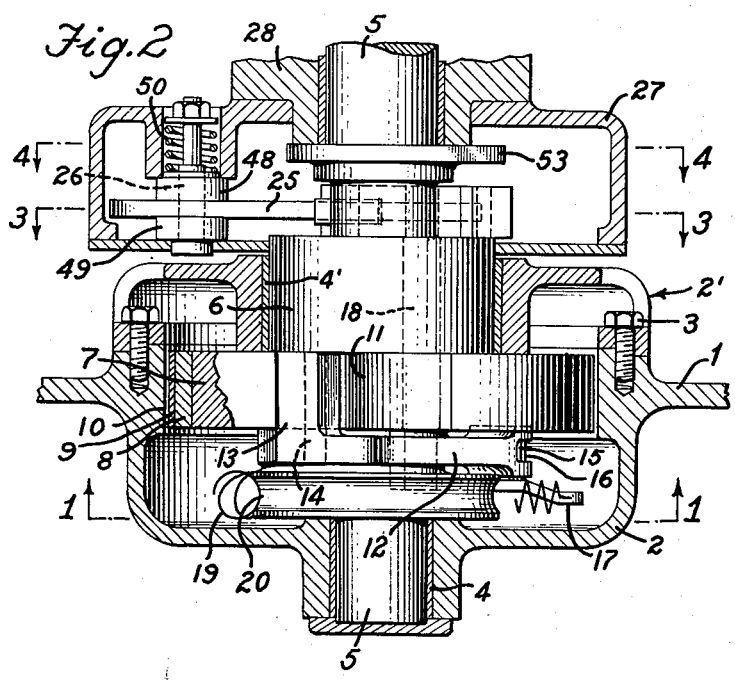
INVENTOR
LEO KNOCHL
BY
ATTORNEYS Sept. 11, 1956 L. KNÖCHL 2,762,480
SPRING ENGAGED AND LATCH RELEASED CLUTCH
Filed Oct. 5, 1950 3 Sheets-Sheet 2

INVENTOR
LEO KNOCHL
BY Young, Emery & Thompson
ATTORNEYS

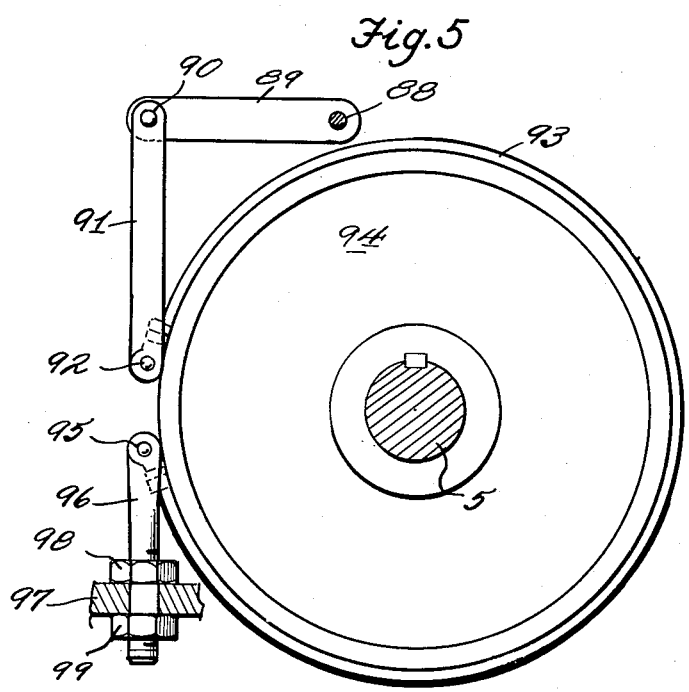

United States Patent Office 2,762,480
Patented Sept. 11, 1956

2,762,480
SPRING ENGAGED AND LATCH RELEASED CLUTCH

Leo Knöchl, Goppingen, Wurttemberg, Germany

Application October 5, 1950, Serial No. 188,551

Claims priority, application Switzerland October 10, 1949

8 Claims. (Cl. 192—82)

This invention relates to a friction coupling for mounting directly on the crankshaft or eccentric shaft of a machine tool with crankshaft or eccentric shaft drive, for example, punching or shearing machines.

In a known mechanism of this kind the engagement of the coupling was induced from relative movement between two rotating members one of which was braked. In another known mechanism the engagement was effected in two stages, a spring producing first a light frictional contact sufficient to carry the actuating means for effecting complete engagement, along a fixed cam into a portion for such engagement.

The present invention consists in providing in a coupling of the kind referred to an energy storing device for example, a spring, capable, when released, of engaging the coupling for transmission of the full torque.

The number of coupling parts is thereby diminished as compared with known mechanisms, also the coupling engagement takes place more rapidly, that is in a smaller angle of revolution of the drive element, yet without shock such as is usual in friction couplings.

In one embodiment of the invention the energy storing means is a tension spring arranged preferably concentrically to the shafts to be coupled, which spring is attached to an engaging lever having a cam which co-operates with an expander lever acting on a friction segment. The concentric arrangement of the spring makes it possible to arrange a long and powerful helical spring in a small coupling housing. Preferably there is keyed on the shaft to be driven through the coupling a coupling element having a track for the spring which surrounds said element. In other embodiments a plurality of such springs may be included.

According to a further feature the coupling element on the driven shaft has an uncoupling shaft extending through and journalled in said element.

A still further feature of the invention consists in that the driving element to which coupling is to be made and which carries the clutch surface for engaging the friction segment, is journalled on both sides of the friction segment whereby warping action due to unilateral application of the coupling forces on the driving element are avoided. In one embodiment the driving element has a hub forming a housing which surrounds the friction segment, which housing is closed on one side by a cover having a bearing boss. By these means a space and material saving enclosure of the coupling parts is achieved. Preferably the hub of the drive element is journalled on an idler bush on the shaft to be coupled, while a second idler bush is provided in the cover boss for a hub of the driven element.

According to another feature the uncoupling shaft is journalled in the driven element and extends through the same and its hub which rotates in the bearing bush of the cover, adjacent and parallel to the driven shaft. This keeps down the diameter of the hub of said driven element which is desirable because the cover for the coupling housing has its bearing boss surrounding the said hub.

A further feature consists in providing a separate casing for the coupling control mechanism which casing is sealed with respect to the rotating parts and is filled with oil.

A still further feature consists in that a spring loaded toggle lever system supported on a movable abutment, is provided, which system when the coupling is disengaged, is near its tripping point (dead centre or self locking position) and its support is dependent on the position of coupling engaging means, in such a manner, that upon actuation of the said means the toggle lever system is tripped until it encounters a stop, and allows the coupling operation to take place, while the restoration of the tripped toggle system to the supported position is effected positively by the rotation of the driven shaft. This makes it possible even with great forces acting on the toggle lever system, to use very small release forces. The engaging force and the engaging stroke can thus be reduced to a minimum to avoid fatigue of the machinist.

In one embodiment the toggle lever system can be sustained on the movable abutment by means of an elongated extension of one of the levers of the system, which further reduces the effort required in disengaging the coupling. A suitable brake for the parts to be uncoupled may be provided which brake is operated in dependence on the coupling engaging operation of the control means, for example it may be effected from stationary, non-rotating control means for such operation. Thereby it is possible to adapt the brake to suit the kind of machine, whether it is fast or slow running without having to change the design of the coupling itself.

Figure 4:
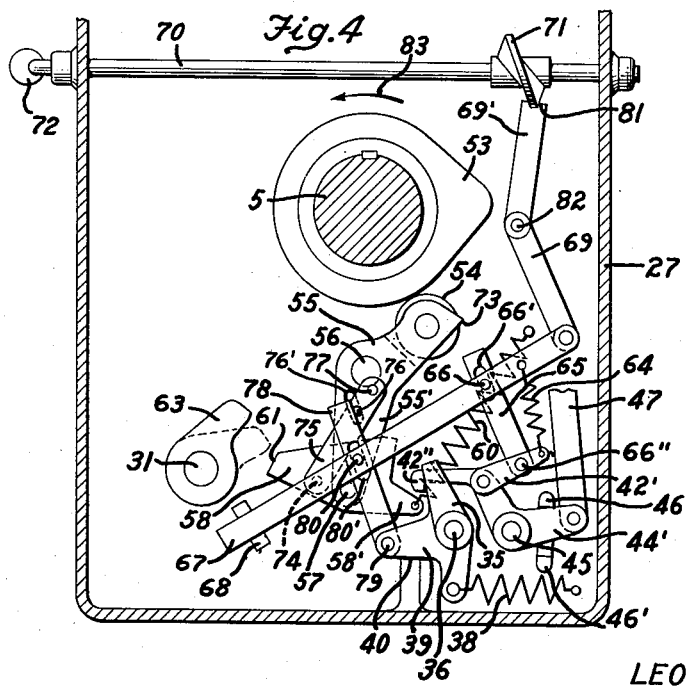

The drawings illustrate an embodiment of the invention in which Fig. 1 is a vertical section through the coupling taken on line 1—1 of Fig. 2 in the direction of the arrows, Fig. 2 is a corresponding horizontal section, Fig. 3 is a vertical section taken on line 3—3 of Fig. 2 in the direction of the arrows, Fig. 4 is a vertical section taken on line 4—4 of Fig. 2 in the direction of the arrows and Fig. 5 is a side view of the detail of the brake mechanism.

The coupling is mounted on the crank shaft or eccentric shaft of a press and is designed for controlling the press for single stroke and continuous operation. When it is set for single stroke action the shafts are automatically coupled, after engagement of the coupling, for a single rotation of the shaft, in such a manner that the punch remains standing always in the same position, namely its uppermost position. The same results when the machinist by oversight maintains the coupling engaging member in engaging position. Upon disengagement a brake is automatically actuated in such a manner that the moving masses of the coupling, the eccentric shaft and the connecting rod head, etc. are reliably and rapidly braked. In this position, as in the case of automatic disengagement after a single stroke, the punch also remains stationary after the coupling, set for continuous operation, is disengaged after a number of revolutions.

The driving member of the coupling consists of a continuously rotating fly wheel or gear wheel which is driven in any suitable manner, of which only the middle portion is shown, Fig. 2. The hub 2 of the fly wheel 1 is formed as a coupling housing closed by means of a cover 2' having a bearing boss and fixed to the hub 2 by screws 3. The hub 2 is mounted on an idling sleeve 4 on the shaft 5 to be driven by the coupling and the cover 2' is similarly mounted on another idling sleeve 4' on the hub 6 of a coupling member 7 fast on the driven shaft 5. The coupling housing 2, 2' surrounds a friction segment 8 with a friction lining 9 coacting with a clutch surface 10 in the hub 2 of the fly wheel. The friction segment 8 bears at one end against a shoulder 11 on the coupling member 7. Its other end engages a lug 13 of an expander lever 12 which lever is pivoted on a pin 14 in the coupling member 7, and carries at its other end a roller 15. The latter contacts a cam 16 on an engaging lever 17 which at one end is attached to a rock shaft 18. At the end of the engaging lever 17 there is attached the energy storing spring 19 which surrounds a substantially cylindrical track 20 on the coupling member 7, the other end of said spring being attached to the coupling member 7 at 21.

Adjacent the rotary hub and housing 2, 2' there is arranged a fixed control casing 27 which also surrounds the shaft 5, this casing being fixed to a frame portion 28 of the press, Fig. 2, and housing the control mechanism which operates the coupling. The casing is sealed with respect to the hub 6 of the coupling member 7 and the shaft 5, and is filled with oil so that the operating mechanism works in oil.

The control mechanism in the casing 27 is connected to a rod 29 which actuates any suitable brake device in dependency upon the position and setting of the coupling, Fig. 3. In the coupling member 7 and adjacent and parallel to the shaft 5 there is mounted the rock shaft 18 one end of which extends into the control casing 27. At this end said shaft carries a lever 22 fast thereon and provided at its end with a roller 23. Its other end constitutes a stop cooperating with the shaft 5 and is equipped with a noise and shock damping lining 24.

Control and safety means

The roller 23 cooperates with a cam lever 25 mounted on a shaft 26 journalled in the walls of the control casing 27. On the shaft are mounted two friction discs 48 and 49 (Fig. 2) which contact the cam lever 25 and are pressed against the same by an adjustable spring 50.

The cam lever 25 is supported by a toggle lever system. The latter comprises a lever 30 pivotally mounted in the casing on the shaft 31, and a link 34 pivoted by pins 32 and 33 to the levers 25 and 30 respectively. Instead of one link 34 two such links could be used, one on either side of the levers 25 and 30. The lever 30 has a long extension arm 30' one end of which has an oblique facing bearing against an arm 35 of a movable abutment which is pivotally mounted in the casing 27 on a pin 36. The movable abutment has two further arms 37 and 39, of which the arm 37 is connected to a spring 38, of which the other end is connected to the housing 27, said spring tending to hold the arm 39 against a fixed stop 40 in the casing 27.

A lug 41 on the abutment arm 35 engages a hook 42" of a detent 42 pivoted on a pin 43 at the end of one arm 44 of a bell crank lever 44, 44'. The bell crank 44, 44' is pivotally mounted on a pin 45 in the casing 27. To one end of the arm 44 is pivoted the engaging rod 47. The movement of the arm 44' is limited by two stops 46 and 46' fixed with respect to the casing 27. In the disengaged position shown in Fig. 3 the arm 44' is held against the stop 46 by a restoring spring of an engaging bar of the machine, whereas during disengagement in which downward movement of the rod 47 in the direction of the arrow 84, Fig. 3, takes place, it is rocked against the detent 42 beyond its pivot 43 has an extending arm 42' integral therewith.

A cam 53, Fig. 4, is fixed on the shaft 5 in the casing 27 which cam cooperates with a roller 54 mounted on one end of a lever with arms 55, 55' pivoted on a pin 56 in the casing 27. The lever 55 has a lug 73 which cooperates with the end of an impact rod 65 pivoted to the arm 42' of the detent 42. A spring 64 arranged between the casing 27 and an end of the arm 42' tends to hold the hook 42" of the detent 42 in engagement with the lug 41 of the pivoted abutment arm 35. In the casing 27 there is also mounted a stop 51 for the arm 30' of the lever 30, which is provided with a noise and impact damping pad 52. The shaft 31 carries a dog 63 provided with a nose 62, which cooperates with a cam surface 61 on a rock plate 58 pivoted on a pin 57 in the end of the arm 55' of the lever 55, and acted upon by a spring 60.

Changeover mechanism from single stroke to continuous operation

The changeover shaft 70 for this purpose is mounted in the control casing 27 and can be operated from outside by means of a knob 72. It has a screw tooth 71 engaging a notch 81 in the end of an arm 69' of a double lever 69, 69' pivoted on a pin 82 in the casing 27. A shift rod 67 is pivoted to one end of the lower arm 69, the other end of which lever slides in a guide member 68 in the casing 27. The impact rod 65 is connected to the shift rod 67 by means of a pin and slot connection 66, 66'.

On the arm 39 of the movable abutment there is pivoted about a pin 79 a push rod 78, and the shift rod 67 has a pin 80 thereon engaging a slot 80' in said rod 78. The push rod cooperates with a stop pin 77 on the end of a link 75 which is pivoted about a pin 74 in the rock plate 58, which has a lug 59 which contacts an edge of the arm 55'. A tension spring 60 is attached to one arm 58' of the rock plate 58, the other end of which spring is anchored to the casing, said spring tending to hold the lug 59 against the arm 55' and therefore to hold the roller 54 against the cam 53.

The link 75 is pivoted to the rock plate 58 at 74 and is guided on the arm 55' by means of a pin and slot connection 76, 76'.

Operation setting for single stroke

In the setting for single stroke operation of the press the parts occupy the position shown in Fig. 4. The operating knob 72 has been moved in such a manner that the screw tooth 71 moves the double lever 69, 69' into the position in which the shift rod 67 has the position illustrated, with the upper end of the impact rod 65 lying in the path of the lug 73 of the lever 55, 55', while the push rod 78 is laterally spaced from the pin 77 on the link 75.

When the coupling engaging rod 47 is depressed for example by means of a pedal or hand lever on the machine operating said rod through suitable connections, the bell crank 44, 44' is rocked clockwise as seen in Figs. 3 and 4. Thereby the detent 42 will draw the abutment arm 35 away from under the arm 30' of the toggle lever system 30, 34. Under the action of the spring 19 the engaging lever 17 then rocks the shaft 18 with the lever 22 thereon whereby its roller 23 moves the cam lever 25, Fig. 3, about the shaft 26 in clockwise direction, that is downwards, the supporting toggle lever arrangement being tripped due to rocking of the lever 30 along with the shaft 31. The shifting of the disengaging shaft continues until the noise and impact damping liner 24 of the lever 22 contacts the shaft 5. The lever 25 is also rocked by means of the spring 19 which acts upon it over the roller 23, and further by the power of the tensioned brake acting through the rod 29. The rocking of the lever 25 terminates when the arm 30' of the toggle lever system 30, 34 encounters the pad 52 of the stop 51. The friction discs 48, 49 brake the movement and in particular they prevent recoil of the lever 30 when striking the stop 51.

By means of the toggle lever system which is nearly tensioned in the uncoupling position, and by means of the oblique position of the abutting surfaces at the end of the long extension arm 30', the result is obtained that in spite of the great power of the spring 19 and the tension force of the brake applied over the rod 29, the contact pressure on the abutment arm 35 is but small so that a small force is sufficient to effect disengagement.

The rocking of the engagement lever 17 by the pull of the spring 19 causes its cam 16 to force the roller 15 of the expander lever 12 to the right, Fig. 1. This lever is thereby caused to rock on its pivot 14 so that its lug 13 will expand the friction segment 8, that is bring its lining 9 against the clutch surface 10 of the hub 2. Thereby the coupling member 7 on the driven shaft 5 is coupled to the hub 2 of the driving wheel 1 for transmission of the full torque. The shaft 5 thus rotates with the coupling member 7 in the direction of the arrow 83, Figs. 1, 3 and 4. The rock shaft 18 with the parts carried thereby, mounted in the coupling member 7, rotate with the latter.

*Disengagement in single stroke operation*

The shaft 5 has a cam 53 thereon, Fig. 4, rotating therewith. Shortly before the roller 23 reaches the position 23' shown in Fig. 3, the cam 53 actuates the roller 54 to rock the lever 55, 55' in clockwise direction as seen in Fig. 4. Thereby the rock plate 58 and its cam surface 61 swing about the pin 56 on the lever 55, the cam surface 61 being moved to the left and upwards as seen in Fig. 4. In this movement it encounters the nose 62 of the dog 63 on the shaft 31 which it displaces from the dotted line position shown in Fig. 4 into the full line or uncoupling position. The rotation of the shaft 31 thus produced causes the toggle lever system 30, 34 and also the cam lever 25 to return to the sustaining position shown in Fig. 3.

If at this instant the coupling operating pedal or lever has already been released then the engaging rod 47 and the detent 42 are again in the position shown in Fig. 3 to which they are restored not only by the restoring spring of the engaging mechanism, not shown, but also by the spring 38. During the rotation of the shaft 31 in counter-clockwise direction which restores the parts 30, 30', 34 and 35 the arm 30' passes below the abutment arm 35, which it momentarily forces back against the action of the spring 38, and finally makes contact therewith in the position shown in Fig. 3. If the pedal or engaging lever has not yet been released the hook 42" of the detent 42 will be brought out of engagement with the lug 41 of the abutment arm 35 thereby forcing the lug 73 against the impact rod 65 owing to the rocking of the lever 55 effected by the cam 53. Thereby the arm 42' of the detent 42 is moved clockwise as seen in Fig. 4 which results in lifting the detent, whereby the spring 38 restores the abutment arm 35 into the position shown in Fig. 3, in which it again lies under the arm 30'.

When the lever 25 has returned to the position Fig. 3 and is again supported in this position, the roller 23 will run on the cam of the lever 25 in the position shown at 23'. Thereby the lever 22 is returned from its coupling position from which it had been rocked from the position shown in Fig. 3 about the shaft 18 in counterclockwise direction, into the uncoupling position by clockwise rotation. The liner 24 is thus again raised from the shaft 5 and the energy storing spring is retensioned, since the engaging lever 17 on the shaft 18 is also rocked backwards along with the lever 22. The friction segment 8 is disengaged under the action of its intrinsic tensioning from the clutch surface 10 whereby the coupling is disengaged. The expander lever 12 is also restored.

The return of the lever 25 operates over the rod 29 to apply the brake, not shown. The power for this purpose is derived from the shaft 5 through the cam 53 and is transmitted through the roller 54 to the arm 55', the rock plate 58 and the dog 63.

From the clog 63 the shaft 31 together with the lever 30 and 30' will be swung and the lever 30 and link 34 will be extended so that the cam lever 25 will be rotated counterclockwise around the shaft 26 and the rod 29 will be moved upwardly, Fig. 3. To the other end of the rod 29 there is pivoted at 86 an arm 87 which is secured on a shaft 88. On the other side of the machine, the shaft 88 carries an arm 89, Fig. 5, to which at 90 a rod 91 is pivotally secured which latter is fastened at one end of a brake band 93. The brake band 93 surrounds a brake disc 94 which latter is secured on the shaft 5 by means of a key. The other end 95 of the brake band 93 is linked to a stationary bolt 96 which latter is adjustably mounted in a frame 97 by means of a pair of nuts 98 and 99 to hold the bolt 96 in adjusted position. If the shaft 88 is set for rotation in a clockwise direction by the rod 29 as described in relation to Figs. 3 and 5, then the brake band 93 will be tensioned and the shaft 5 together with its parts connected thereto will be braked by the brake disc 94.

*Setting for continuous operation*

In the position for continuous operation the knob 72 is so operated that the lever 69, 69' is rocked anti-clockwise by the screw tooth 71 as seen in Fig. 4. The shift rod 67 is thereby shifted upwards and to the right with respect to its position as shown in Fig. 4. By means of the pin 66 of the rod 67 engaging the slot 66', the impact rod 65 pivoted on the pin 66" in the arm 42' of the detent 42 is moved to the right as shown in Fig. 4 until it comes out of the path of the lug 73 of the lever 55. When the lever 55 rocks up and down under the action of the cam 53 and lug 73 idly passes the impact rod 65 and the detent 42 remains in engagement with the abutment arm 35 which thus can return into the position supporting the toggle lever system 30, 34, as long as the pedal or lever is held in engaging position and rod 47, Fig. 3, is depressed.

The moving of the shift rod 67 to setting for continuous operation also causes the push rod 78 in Fig. 4 to move to the right, by the action of the pin 80 engaging the slot 80'. In this movement the edge of the push rod 78 arrives in front of the pin 77 fixed on the link 75, thereby lifting this link when the arm 39 of the movable abutment, along with the arm 35, is rocked in clockwise direction about the pin 36 against action of the spring 38 in uncoupling movement, that is, it is lifted from the stop 40 in such a manner that the middle of the pin 77 in Fig. 4 contacts the middle of the pin 56. By this movement, in which the pin 76 of the link 75 slides in the slot 76', of the arm 55', the rock plate 58 is swung in clockwise direction of the lever arm 55', Fig. 4. The cam surface 61 is thereby raised, as seen in Fig. 4 to such extent that it passes idly the nose 62 of dog 63 when, after uncoupling, the cam 53 periodically rocks the lever 55 through the roller 54. The dog 63 thus remains in the dotted line position shown in Fig. 4, as long as coupling is established and the shaft 31 on which it is seated is not rocking counterclockwise; the toggle lever system retaining the cam lever 25, and the cam lever itself are thus not returned into the position shown in Fig. 3, and the coupling thus remains engaged.

*Uncoupling in continuous operation*

If, while the machine is running in continuous operation, without the cam lever 25 being able to return to the position shown in Fig. 2, the machinist should finally release the coupling lever or pedal, the rod 47 in Fig. 3 thus being moved upwards against the arrow 84, then the abutment arm 25 is able to return to the position of Fig. 3. Thereby the push rod 78, Fig. 4, is again moved downwards to such extent that the cam surface 61 again arrives below the nose 62 of the dog 63, shown in dotted line position. The rock plate 58 then yieldingly passes, under the action of the spring 60, past the end of the dog 63. Then the rock plate 58 causes by action of the cam surface 61 and the dog 63, the shaft 31 and parts mounted thereon to return to the position of Fig. 3.

The illustrated embodiment of the coupling, its change-over and control mechanisms can be modified in many ways. It is immaterial in what manner the fixed connection of the various parts is effected. These parts may be made integral or fabricated of several components. Embodiments are possible in which the control mechanism is not immersed in oil. The friction brake for the crank lever 25 may be of any suitable type, for example, compressors operating in oil to offer frictional resistance, or may be spring, oil, or pneumatic dampers. Floatingly pivoted levers can also be arranged between two bearing positions, and rollers and slide surfaces can be interchanged.

I claim as my invention:

1. In combination a driving element, a driven shaft, a coupling member carried by said driven shaft, clutch means carried by said coupling member and engageable with said driving element, a rock shaft carried by said coupling member, clutch operating means carried by said coupling member including a clutch operating lever, a spring connected to the clutch operating lever and the coupling member for normally causing engagement of said clutch means, said clutch operating lever being affixed to one end of said rock shaft, means mounted on the opposite end of said rock shaft for controlling said clutch operating lever, said means comprising a pivotable arm having a roller thereon, lever means engageable by said roller, an abutment arm engaged with said lever means, means for withdrawing said abutment arm to permit rotation of said pivotable arm and thereby permit engagement of the clutch means, and a cam on said driven shaft for resetting said lever means in engagement with said abutment arm.

2. The structure of claim 1, in which said spring is a helix and in which the coupling member is provided with a circumferential groove in which said spring rides.

3. The structure of claim 1, including a pivotally mounted rock plate associated with said lever means, a pivotally mounted cam lever pivotally connected to said rock plate to rock same and having a roller engaging said cam, a disengaging dog operatively connected to said lever means having a portion engageable by said rock plate, movement of said rock plate causing movement of said dog and lever means to disengage the clutch means.

4. The structure of claim 3, having a shiftable bar operatively connected to said rock plate to rock same to a position to clear said dog and prevent disengaging of said clutch.

5. The structure of claim 2, including spring means normally urging said abutment arm into lever means engaging position.

6. The structure of claim 5, wherein the means for withdrawing said abutment arm includes a bell crank lever and a shipper arm connected to said bell crank lever, a lug arm connected to said bell crank lever and engaged with said abutment arm.

7. In combination a driving element, a driven shaft, a coupling member carried by said driven shaft, clutch means carried by said coupling member and engageable with said driving element, a rock shaft carried by said coupling member, clutch operating means carried by said coupling member including a clutch operating lever, a spring connected to the clutch operating lever and the coupling member for normally causing engagement of said clutch means, said clutch operating lever being affixed to one end of said rock shaft, means mounted on the opposite end of said rock shaft controlling said clutch operating lever, said means comprising an arm having a roller thereon, lever means engageable by said roller, an abutment arm engaged with said lever means, means for withdrawing said abutment arm to permit rotation of said pivotable arm and thereby permit engagement of the clutch means, and a cam on said driven shaft, a lever pivotally mounted intermediate its ends adjacent said cam and having a cam roller at one end, a rock plate pivotally mounted adjacent the other end of said cam lever and pivotally connected thereto for rocking movement of said rock plate by said cam, a disengaging dog operatively associated with said lever means having a portion in the path of movement of said rock plate, whereby rotation of said cam moves said dog and lever means to disengage the clutch.

8. The structure of claim 7, including a shifting rod operatively connected with said rocker plate and movable to rock said plate to a position to clear said dog.

References Cited in the file of this patent

UNITED STATES PATENTS

| 885,684 | Broughton | Apr. 21, 1908 |
| 1,164,901 | Zaleski | Dec. 21, 1915 |
| 1,342,965 | Lindgren | June 8, 1920 |
| 1,556,277 | Wood | Oct. 6, 1925 |
| 1,811,028 | Ryan | June 23, 1931 |
| 1,818,986 | Dorman et al. | Aug. 18, 1931 |
| 1,820,021 | Hoch | Aug. 25, 1931 |
| 2,130,486 | Florcyk | Sept. 20, 1938 |
| 2,135,971 | Dukelow et al. | Nov. 8, 1938 |
| 2,210,459 | Knochl | Aug. 6, 1940 |
| 2,344,410 | Rauh | Mar. 14, 1944 |
| 2,411,543 | Kann | Nov. 26, 1946 |
| 2,500,346 | Christian et al. | Mar. 14, 1950 |